United States Patent
Young et al.

(10) Patent No.: US 10,337,198 B2
(45) Date of Patent: Jul. 2, 2019

(54) VENTED INSULATED SPA COVER

(71) Applicant: Dow Global Technologies LLC, Midland, MI (US)

(72) Inventors: W. Scott Young, Sanford, MI (US); Jeffrey M. Alcott, Midland, MI (US); Gregory T. Stewart, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 54 days.

(21) Appl. No.: 15/521,420

(22) PCT Filed: Nov. 12, 2015

(86) PCT No.: PCT/US2015/060288
§ 371 (c)(1),
(2) Date: Apr. 24, 2017

(87) PCT Pub. No.: WO2016/081265
PCT Pub. Date: May 26, 2016

(65) Prior Publication Data
US 2017/0314281 A1 Nov. 2, 2017

Related U.S. Application Data

(60) Provisional application No. 62/081,595, filed on Nov. 19, 2014.

(51) Int. Cl.
*E04H 4/08* (2006.01)
*B32B 5/18* (2006.01)
(Continued)

(52) U.S. Cl.
CPC ............... *E04H 4/08* (2013.01); *B32B 3/02* (2013.01); *B32B 3/30* (2013.01); *B32B 5/18* (2013.01);
(Continued)

(58) Field of Classification Search
CPC ................................................... G06F 3/04847
See application file for complete search history.

(56) References Cited

U.S. PATENT DOCUMENTS 5,086,525 A   2/1992  Christopher
2005/0144714 A1   7/2005  Peng et al.
(Continued)

FOREIGN PATENT DOCUMENTS

CA   2114079 A1   7/1995
GB   2466007 A  *  6/2010  ............... E04H 4/08
(Continued)

OTHER PUBLICATIONS

American Society of Heating, Refrigeration, and Air-Conditional Engineers (ASHRAE) in the 2013 ASHRAE Handbook Fundamentals (pp. 25.15-25.16).
(Continued)

*Primary Examiner* — Lauren A Crane

(57) ABSTRACT

An insulated spa cover (10) contains a thermal insulating core (30), a top cover (150) with an average permeance of at least 57.2 nanograms/Pascal*seconds*square meters, and a hydrostatic head test value of at least 5,000 Pascals, a vapor barrier (130) and optionally a bottom sheet (140) apart from the vapor barrier. Venting pathways are defined around the thermally insulating core to facilitate escape of water vapor.

10 Claims, 1 Drawing Sheet

(51) Int. Cl.

| | |
|---|---|
| *B32B 27/06* | (2006.01) |
| *B32B 27/08* | (2006.01) |
| *B32B 27/32* | (2006.01) |
| *B32B 3/02* | (2006.01) |
| *B32B 3/30* | (2006.01) |
| B32B 5/02 | (2006.01) |
| B32B 5/24 | (2006.01) |
| B32B 5/26 | (2006.01) |
| B32B 7/08 | (2019.01) |
| B32B 7/12 | (2006.01) |
| B32B 15/04 | (2006.01) |
| B32B 27/12 | (2006.01) |
| B32B 27/30 | (2006.01) |
| A61H 33/00 | (2006.01) |

(52) U.S. Cl.
CPC ............ *B32B 27/065* (2013.01); *B32B 27/08* (2013.01); *B32B 27/32* (2013.01); *A61H 33/60* (2013.01); *B32B 5/022* (2013.01); *B32B 5/024* (2013.01); *B32B 5/245* (2013.01); *B32B 5/26* (2013.01); *B32B 7/08* (2013.01); *B32B 7/12* (2013.01); *B32B 15/046* (2013.01); *B32B 27/12* (2013.01); *B32B 27/304* (2013.01); *B32B 2255/10* (2013.01); *B32B 2255/205* (2013.01); *B32B 2262/0223* (2013.01); *B32B 2262/0253* (2013.01); *B32B 2262/0276* (2013.01); *B32B 2266/0228* (2013.01); *B32B 2266/0278* (2013.01); *B32B 2266/06* (2013.01); *B32B 2307/304* (2013.01); *B32B 2307/714* (2013.01); *B32B 2307/72* (2013.01); *B32B 2307/724* (2013.01); *B32B 2307/7246* (2013.01); *B32B 2307/732* (2013.01); *B32B 2419/00* (2013.01)

(56) References Cited

U.S. PATENT DOCUMENTS

| | | |
|---|---|---|
| 2011/0088157 A1 | 4/2011 | Young |
| 2012/0210508 A1 | 8/2012 | Tudor |

FOREIGN PATENT DOCUMENTS

| | | |
|---|---|---|
| JP | 1977143161 A | 11/1977 |
| JP | 1982034426 | 3/1980 |
| JP | 1981155686 | 11/1980 |
| JP | 1982137396 | 10/1981 |
| JP | 2006043073 A | 2/2006 |

OTHER PUBLICATIONS

Search report from corresponding Japanese 2017-526496 application, dated Jun. 13, 2018.

* cited by examiner (a)

(b)

VENTED INSULATED SPA COVER

BACKGROUND OF THE INVENTION

Field of the Invention

The present invention relates to a vented insulated cover suitable for use over a spa, swimming pool or other aqueous environment.

INTRODUCTION

A common problem with insulated spa covers is that they absorb moisture over time. As a result of absorbing moisture, the spa cover becomes heavy, loses insulating properties and can degrade and develop mold and mildew. Spa covers are designed with an insulating core, typically expanded polystyrene foam, sealed within a plastic casing that is intended to keep moisture away from the insulating core. In reality, moisture tends to permeate through the plastic casing, condense and become trapped within the casing and insulating core. Water permeability through the plastic casing tends to increase over time as chemicals used to treat spa water react with and degrade the plastic of the casing.

Attempts to prevent moisture absorption in spa covers have include many types of methods of sealing the insulting core. Plastic casing such as barrier films have been taped around the core, heat sealed in various ways around the core and even metalized plastic casings have been employed. Nonetheless, moisture absorption is still a major problem with insulated spa covers.

It is desirable to discover an insulating spa cover that reduces or eliminates problems with water absorption in its insulating core.

BRIEF SUMMARY OF THE INVENTION

The present invention provides an insulating spa cover that reduces or eliminates problems with water absorption in its insulating core. The present invention provides a uniquely designed insulating spa cover that is a result of approaching the problem of moisture absorption by allowing vapor to escape from in and around the foam core rather than trying to prevent moisture permeation into the foam core.

Surprisingly, it has been discovered that moisture absorption can be reduced or even eliminated from the insulating core of an insulating spa cover if it is not sealed within a vapor impermeable material, but rather allowed to have vapor permeate from around the insulating core, or in optional embodiments through open channels in the insulating core and out from the spa cover.

DETAILED DESCRIPTION OF THE INVENTION

Figure 1:
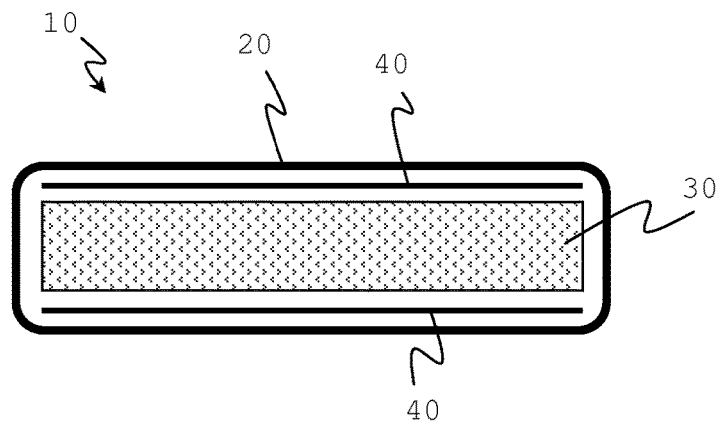
FIG. 1 illustrates a cross sectional view of a typical spa cover.

Test methods refer to the most recent test method as of the priority date of this document unless a date is indicated with the test method number. References to test methods contain both a reference to the testing society and the test method number. Test method organizations are referenced by one of the following abbreviations: ASTM refers to American Society for Testing and Materials; EN refers to European Norm; DIN refers to Deutsches Institute für Normung; and ISO refers to International Organization for Standards. AATCC refers to American Association of Textile Chemists and Colorists.

"And/or" means "and, or as an alternative". All ranges include endpoints unless otherwise indicated.

Articles have one or more than one side. The side having a planar surface area equal to the largest planar surface area of any of the sides of the article is a "primary side". If there is a side opposite a primary side (for example, as in a square or rectangular board), the opposite side is also a primary side. "Minor sides" are sides of an article that have a planar surface area that is less than that of a primary side (for example, the edges extending between the primary sides of a square or rectangular board). Determine planar surface area of a side by determining the surface are of a projection of the side onto a plane thereby avoiding accounting for hills, valleys and porosity in a surface when determining the surface area. For avoidance of doubt, a "side" is a bounding surface of an object.

"Spa cover" as used herein refers to any cover that resides over a body of water, especially a body of water having a water temperature of 27 degrees Celsius (° C.) or higher, preferably 30° C. or higher, and more preferably 35° C. or higher. Typically, a spa cover is used to cover a spa, hot tub or swimming pool, most typically a spa or hot tub. A spa is a relatively small (typically less than 5700 liter) tub of heated or warm water. A hot tub is a spa that also has water jets and/or bubbles that can be introduced in the warm water. A spa cover has opposing top and bottom primary sides, with the bottom primary side the one that is placed most proximate to the water of a spa when in use. For use herein, "top" and "bottom" orientations are in like manner where "bottom" refers to the side more proximate to the spa water when in use relative to the "top".

The present invention is an insulated spa cover, which is a spa cover comprising thermal insulating material. The thermal insulating material is present primarily in the form of a thermally insulating core. The thermally insulating core can be or comprise any thermally insulating material including mineral wool, polymeric foam or one or more than one insulating article such as vacuum insulation panels. Desirably, the thermally insulating core comprises, preferably is, polymeric foam. Suitable polymeric foam includes thermoplastic and thermoset foam. Preferably, the thermally insulating core comprises or is thermoplastic polymer foam selected from a group consisting of extruded polystyrene (XPS) foam and expanded polystyrene (EPS) foam.

EPS foam, also known as bead foam or expanded bead foam has characteristic polymer skins that surround groups of cells throughout the foam article. The skins are remnants of polymer skin around individual foam beads that expand and coalesce to form EPS foam. Prepare EPS foam by heating polymer beads (typically, prefoamed polymer beads) comprising blowing agent in a mold to above the softening point of the polymer in the beads and allow the beads to expand and contact one another. Typically, polymer skin around a bead coalesces with the skin of one or more than one other bead so as to form a single foam article comprising multiple expanded foam beads coalesced together. Adhesives can also be included to attach expanded foam beads to one another to form EPS foam.

XPS foam is free of polymer skins surrounding groups of cells through the foam article that are characteristic of EPS foam. XPS foam is prepared by extruding a foamable polymer mixture that comprises molten thermoplastic polymer and blowing agent under sufficient pressure to preclude foaming through a die to an atmosphere of lower pressure that allows the blowing agent to expand and foam the molten thermoplastic polymer into foam as the polymer cools.

Thermoplastic polymers suitable for use in EPS foam and XPS foam include polystyrene homopolymer and polystyrene copolymers. Examples of suitable styrenic copolymers include styrene/acrylonitrile (SAN) copolymer, preferably containing 15 wt % or less copolymerized acrylonitrile monomer based on total SAN copolymer weight.

Polymeric foam thermally insulating cores are desirably closed cell, meaning they have an open cell content of 30% or less, preferably 20% or less, more preferably 10% or less and yet more preferably 5% or less and can be 0% as determined according to ASTM D6226-05.

Thermally insulating cores have opposing top and bottom primary sides. The thermally insulating core is desirably generally in board form and may comprise multiple boards. Boards are articles having two opposing primary sides that are separated by a thickness dimension of the board. One or more than one side may be contoured meaning that a side can be other than flat. For instance, it is common for the top primary side of a thermally insulating core to have a tapered shape to readily shed water (for example, rain water) that falls on it. The top primary side of a thermally insulating core can be flat (having a linear profile or non-flat (having a non-linear profile). Non-flat shapes suitable for the top of the thermally insulating core include, pyramid-shaped, slanted, curved or any other shape. The bottom primary side of the thermally insulating core can be flat or be shaped with a non-linear profile as well. It is desirable for the bottom primary side of the thermally insulating core to have a shape that defines flow channels across or through the bottom primary side. For instance, the thermally insulating core can have grooves defined across, even crisscrossing across the bottom primary side. The bottom primary side can also, or alternatively have protrusions defined therein. Protrusions on the bottom primary side can serve to hold the bottom cover away from portions of the bottom primary side of the thermally insulating core and thereby allow for vapor flow along the bottom primary side of the thermally insulating core. Similarly, the thermally insulating core can have defined therethrough holes such a perforations to facilitate vapor permeation from the bottom primary side to the top primary side of the thermally insulating core without extensive penetration throughout the thermally insulating foam core. Alternatively, the thermally insulating foam core can be free of holes such as perforations that extend entirely through the insulating core, through both the bottom side and the top side.

There may be multiple (that is, more than one) component comprising the thermally insulating core. For instance, the thermally insulating core can comprise more than one polymer foam board to facilitate folding of the thermally insulated spa cover. The thermally insulating core can comprise one type of thermally insulating material or multiple types of thermally insulating materials. For instance, the thermally insulating core can comprise one type of polymer foam or multiple types of polymer foam that can exist as multiple pieces or a single piece.

Desirably, the thermally insulating core has a thermal conductivity of less than 0.044 Watts per meter*Kelvin (W/m*K), preferably 0.036 W/m*K or less, more preferably 0.028 W/m*K or less. There is no lower limit for the thermal conductivity of the thermally insulated core necessitated by the invention because the lower the thermal conductivity the better the thermally insulating properties and that is a primary objective of the thermally insulating core. Determine thermal conductivity of a thermally insulating core according to EN 8301.

The thermally insulating core typically has a thickness of 5 centimeters (cm) or more, preferably 7.5 cm or more and can be 10 cm or more, 12.5 cm or more, even 15 cm or more while at the same time is desirably 20 cm or less, preferably 15 cm or less.

A top cover extends over and entirely covers the top primary side of the thermally insulating core. The top cover of the present invention serves to help distinguish the present invention from other spa covers. The top cover of the present invention is designed to intentionally be permeable to vapor rather than designed to be impervious to vapor. The top cover has an average permeance over the entire top cover of at least 57.2 nanograms/Pascal*seconds*square meters (ng/Pa*s*m$^2$), and the permeance is preferably 143 ng/Pa*s*m$^2$ or higher while at the same time is typically, though not necessarily, 22,300 ng/Pa*s*m$^2$ or less. An upper limit on vapor permeability is dictated more by the hydrostatic head test value for the top cover, which is a measure of water resistance. At the same time, the top cover has a hydrostatic head test value for any 10 square centimeter section of the top cover that is at least 5,000 Pascals and can be 7,500 Pascals or more and even 10,000 Pascals or more. Determine permeance using the Desiccant Method of ASTM E96. Determine a hydrostatic head test value according the AATCC-127. A feature of the present invention is that the top cover allows water vapor to permeate out from inside the cover rather than retain it inside with the thermally insulating core. As a result, water is less likely to build up within the spa cover. Therefore, the permeance of the top cover is at least 57.2 ng/Pa*s*m$^2$. However, the top cover should not be so permeable that rain water falling on the top cover will permeate readily into the spa cover. Therefore the hydrostatic head test value is at least 5,000 Pascals.

Examples of suitable materials for use as the top cover include membrane materials such as that sold under the trade name GORE-TEX™ (GORE-TEX is a trademark of W.L.Gore & Associates, Inc.), WeatherMAX™ 80 (WeatherMAX is a trademark of Safety Components Fabric Technologies, Inc.) and other woven and non-woven materials. Desirably, the top cover is a synthetic material to enhance longevity.

A vapor barrier layer resides proximate to the bottom primary side of the thermally insulating core. The vapor barrier covers at least 75%, preferably 80% or more, more preferably 90% or more and can cover 95% or more and even 100% of the bottom primary side of the thermally insulating core as measured as a percent of surface area. Ideally, the vapor barrier layer covers the entire bottom of the thermally insulating core that is directly over water when the spa cover is in use. The purpose of the vapor barrier is to hinder water vapor from permeating into the spa cover and to the thermally insulating core. Therefore, the vapor barrier layer should have a relatively low permeance. If water vapor does penetrate into the spa cover it is desirable for the water vapor to more readily flow around to the top cover and permeate out from the spa cover rather than penetrate to the thermally insulating foam core and into the foam core. Therefore, it is desirable for the top cover to have a higher permeance than the vapor barrier layer. Hence, the vapor barrier layer has a permeance lower than that of the top cover and is desirably less than 57.2 ng/Pa*s*m$^2$, preferably 50 ng/Pa*s*m² or less, more preferably 10 ng/Pa*s*m² or less and more preferably one ng/Pa*s*m² or less and can be 0.1 ng/Pa*s*m² or less and even 0.01 ng/Pa*s*m² or less.

The vapor barrier can serve as a bottom sheet or there can be a separate bottom sheet. If there is a bottom sheet separate from the vapor barrier layer, the vapor barrier layer is between the bottom sheet and the thermally insulating core. The bottom sheet, regardless of whether it is the vapor barrier layer or an additional material, is desirably durable and has vapor barrier properties as described for the vapor barrier layer. The vapor barrier layer can be made from materials that include polymer film, metalized polymer film, and metal film. Suitable polymer film includes, for example, polyethylene film, polyester bonded polyvinyl chloride and other known vapor barrier materials.

The bottom sheet if present, and if not present then the vapor barrier layer, serves as a bottom cover for the thermally insulating spa cover. The bottom cover is attached to the top cover to form an enclosure that surrounds the thermally insulating core. If the bottom cover is separate from the barrier layer then the enclosure further surrounds the vapor barrier layer between the thermally insulating core and the bottom cover. The bottom cover is desirably a durable material that can stand up to abrasion during handling such as that which may be experienced by dragging a spa cover on and off from a spa. Additionally, it is desirable for the bottom cover to be chemically resistant to chemicals that may be present in spa water such as bromine, chlorine and ozone. A material is deemed "chemically resistant" to a chemical if the material retains 90% of its tensile strength as determined by ASTM D882 after immersion exposure in a 300 weight part per million weight part solution of the chemical at a 1% strain for 168 hours at 50° C. in accordance with ASTM D543-06. One desirable material suitable for use as a chemically resistant bottom sheet is polyester bonded polyvinyl chloride multilayer composite fabric.

The bottom cover and top cover are attached to one another so as to form an enclosure containing the thermally insulating core and, if separate from the bottom cover, the vapor barrier layer. The components within the enclosure are placed between the bottom cover and top cover prior to sealing it as an enclosure. Desirably, the top cover and bottom cover are attached with a water-tight seal. For example, polymeric top and bottom covers can be melt-welded together to attach them. Additionally, or alternatively, an adhesive can be used to adhesively attach a top and bottom cover to one another around the materials that they enclose. Stitching can further be used to attach top and bottom covers together alone or in combination with melt welding and/or an adhesive.

The insulated spa cover contains venting pathways defined within the enclosure formed by the top and bottom covers. The venting pathways provide a vapor path from inside (that is, within the enclosure) of the bottom cover to the top cover. The venting pathways have a permeance that is greater than the average permeance of the bottom cover and the vapor barrier layer so as to allow whatever vapor may permeate the bottom cover to readily escape from within the spa cover through the top cover.

The venting pathways can be defined in the bottom side of the thermally insulating core. As described above, the thermally insulating core can have protrusions, grooves, channels and the like defined in its bottom primary side. As a result, vapor can travel through such grooves, channels, around such protrusions and the like to readily move around the thermally insulating core. The thermally insulating core can further include grooves, channels, protrusions and the like on the minor sides extending between primary sides in order to facility vapor transport from the bottom primary side of the thermal insulating core, around the minor sides of the thermally insulating core and to the top cover. Likewise, the thermal insulating core can have grooves, channels protrusions and the like defined on its top primary surface to further facilitate transport of vapor across its top primary surface to access more surface area of the top cover for more efficient escape of the vapor through the top cover.

In addition to, or as an alternative to, features such a channels, grooves, protrusions and the like that can be defined on the thermally insulating core the spa cover can include a layer of venting material within the enclosure of the top and bottom covers. The layer of venting material alone, or in combination with the features describe for the thermally insulating core, serves to define a relatively highly vapor permeable pathway (venting pathway) from within the bottom cover around the thermal insulating core to the top cover. The layer of venting material serves as at least a portion of what defines the venting pathway in the spa cover so it has a permeance that is greater than the average permeance of the bottom cover. Desirably, the layer of venting material has a permeance of 50 ng/Pa*s*m² or greater, preferably 10 ng/Pa*s*m² or greater, more preferably 100 ng/Pa*s*m² or greater, still more preferably 10,000 ng/Pa*s*m² or greater, yet more preferably 1,000,000 ng/Pa*s*m² or greater as measured according to ASTM E96 using the Desiccant Method.

Suitable materials that can serve as a venting material to form the layer of venting material include polymeric batting, polymeric non-woven materials and open-celled foam (especially polymeric foam). Suitable polymers are desirably selected from polypropylene, polyurethane, polyesters and polyethylene. Open-celled foam has an open cell content of more than 30%, preferably more than 50%, yet more preferably 70% or more, even more preferably 80% or more, yet even more preferably 90% or more and most preferably 95% or more and can be 100% as determined by ASTM D6226-05.

The enclosure formed from the top and bottom covers necessarily extend over the minor sides of the thermally insulating core. It is not critical which of the top and bottom cover extends over the minor sides of the thermally insulating core. The top cover can extend over one or more of the minor sides of the thermally insulating core to enhance venting capabilities from inside the spa cover or extend over none of the minor sides of the thermally insulating core.

EXAMPLES

Use teachings and calculations on interstitial condensation and drying using a dew-point method as set forth by American Society of Heating, Refrigeration, and Air-Conditional Engineers (ASHRAE) in the 2013 ASHRAE Handbook Fundamentals (pages 25.15-25.16) to model potential condensation in a spa cover structure. The calculation allows one to determine extent and location of condensation within a spa structure under steady-state conditions.

For the following Comparative Examples (Comp Exs) and Examples (Exs), conduct calculations using a water ("interior") temperature of 38° C. (100 degrees Fahrenheit (° F.)) and an outside temperature of 7° C. (45° F.), which corresponds to an average annual outside temperature in Chicago, Ill. USA. "Interior" humidity, which corresponds to humidity between the spa water and spa cover, is 100%. "Exterior" humidity, which corresponds to outside humidity around the spa cover, is 50%. Notably, permeance through polymer films on the bottom side of the thermally insulating core are increased to account for chemical degradation of the polymer film over extended exposure to chlorine, bromine and/or ozone from the spa water.

Comparative Example A

Table 1 presents the component layers for a "standard" spa cover structure. FIG. 1 illustrates a cross section of such a spa cover to provide a visual indication of the structure. Spa cover 10 comprises a vinyl and polyester marine vinyl covering 20 as an enclosure around the remaining components. The thermally insulating core 30 is an EPS foam (that is, molded beadboard) having a density of 21.6 kilograms per cubic meter. On both the top and bottom of thermally insulating core 30 are 0.015 centimeter (6 mil) thick polyethylene film vapor barriers 40.

Dewpoint modeling of the structure of Table 1 using the ASHRAE algorithm indicates that moisture is expected to accumulate at a rate of 226 grams (7.957 ounces) per day on the outside marine vinyl covering above the spa water. However, condensation is also evident inside the spa cover at a rate of 0.034 grams (0.012 ounces) on the bottom 6 mil polyethylene layer and 0.28 grams (0.010 ounces) on the molded beadboard, which is the thermally insulating core component of the spa cover. These condensation rates are per 929 square centimeters (one square foot) of the component per day.

The modeling results correspond to an interior water accumulation rate of approximately 0.6 grams (0.022 ounces) per square foot of spa cover per day. A typical spa cover is approximately 4.6 square meters (50 square feet), which corresponds to an internal moisture accumulation of approximately 11 kilograms (25 pounds) per year. This result is typical of real world experience.

TABLE 1

| Component | Thickness (centimeters) | Thermal Conductivity (W/m * K) | Permeance (ng/Pa * s * m$^2$) |
|---|---|---|---|
| Internal Air film | 0.25 | 0.24 | 57,200 |
| Marine vinyl covering (bottom cover) | 0.020 | 1.44 | 95.3 |
| Polyethylene film (bottom) | 0.015 | 14.4 | 9.1 |
| Molded Beadboard (21.6 kilograms per cubic meter; 1.35 pounds per square foot) | 7.62 | 0.012 | 44.0 |
| Polyethylene film (top) | 0.01524 | 14.4 | 3.4 |
| Marine vinyl covering (top cover) | 0.2032 | 1.44 | 38.1 |
| Outside Air film | 0.254 | 0.847 | 57,200 |

Example 1

Table 2 presents the component layers for a thermally insulating spa cover structure of the present invention. The permeability of the molded beedboard thermally insulating layer is higher for this structure than for Comparative Example A because it takes into account the presence of venting pathways that facilitate vapor permeability through and/or around the thermally insulating core. The venting pathways can be around or through the thermally insulating core as long as they provide an average permeance for between the bottom polyethylene film layer and the high permeability top cover that corresponds to the stated permeability value.

Figure 2:
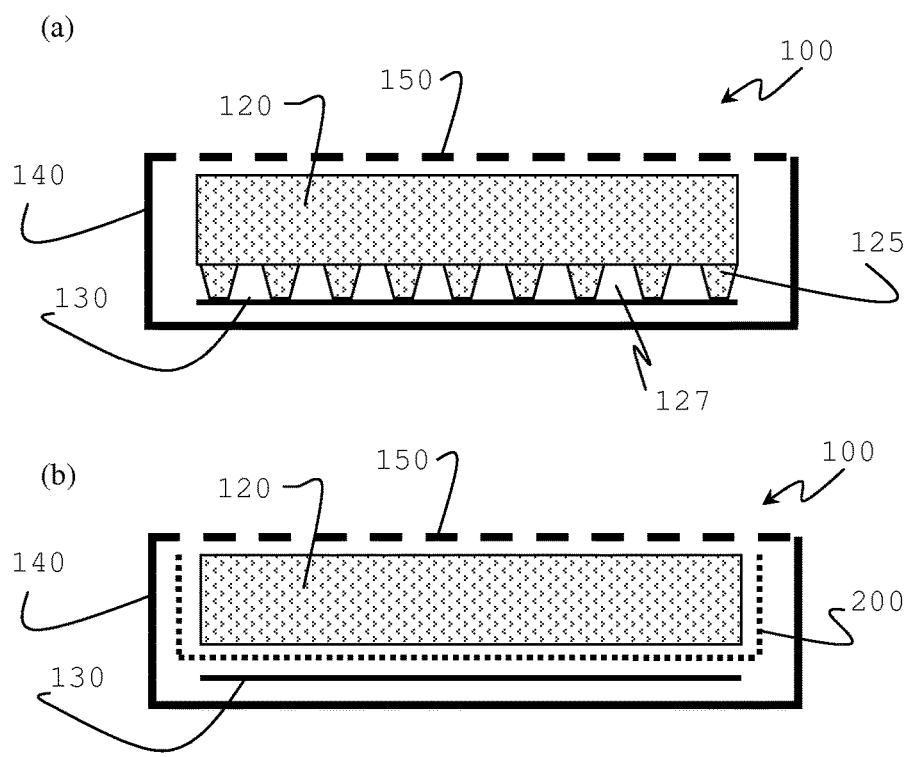
FIG. 2 illustrates to structures, 2(*a*) and 2(*b*), that show cross sectional views of insulated spa covers of the present invention.

FIG. 2 provides two different options for structures suitable for use as thermally insulated spa cover 100 of Example 1. Structure 2(a) utilizes venting pathways 110 created by protrusions 125 on the bottom primary side 127 of thermally insulating core 120. Structure 2(b) contains venting pathways (not shown) defined through a layer of venting material 200 residing between thermally insulating core 120 and vapor barrier layer 130.

Both structures 2(a) and 2(b) comprise thermally insulating core 120 which is an EPS foam molded beedboard having a density of 21.6 kilograms per cubic meter, a bottom sheet made of a vinyl and polyester marine cover serving as bottom sheet 140, 0.010 centimeter thick polyethylene vapor barrier layer 130 (which is actually thinner than the vapor barrier layer in Comp Ex A) and top cover 150 that is constructed using WeatherMAX™ 80 breathable waterproof fabric made by Safety Components Fabric Technologies.

Dewpoint modeling of the structure of Table 2 using the ASHRAE modeling algorithm indicates that moisture is expected to accumulate at a rate of 226 grams (7.957 ounces) per day on the outside of bottom sheet 140 above the spa water, just like spa cover 10 of Comp Ex A. However, unlike spa cover 10, no moisture is found to accumulate within the thermally insulated spa cover 100.

TABLE 2

| Component | Thickness (centimeters) | Thermal Conductivity (W/m * K) | Permeance (ng/Pa * s * m$^2$) |
|---|---|---|---|
| Internal Air film | 0.25 | 0.24 | 0.001 |
| Marine vinyl covering (bottom cover) | 0.20 | 1.44 | 0.600 |
| Polyethylene film | 0.011 | 14.4 | 4.80 |
| Molded Beadboard (21.6 kilograms per cubic meter; 1.35 pounds per square foot) | 7.62 | 0.012 | 0.700 |
| Top Cover | 0.2032 | 1.44 | 0.050 |
| Outside Air film | 0.254 | 0.847 | 0.001 |

What is claimed is:

1. An insulated spa cover comprising:
   (a) a thermally insulating core having opposing top and bottom primary sides;
   (b) a top cover that extends over and entirely covers the top primary side of the thermally insulating core, the top cover having an average permeance over the entire top cover of at least 57.2 nanograms/ Pascal*seconds*square meters as determined according to ASTM E96 Desiccant Method and any 10 square centimeter portion of the top cover has a hydrostatic head test value of at least 5,000 Pascals determined according to AATCC-127;
   (c) a vapor barrier layer proximate to and covering at least 75% of the bottom primary side of the thermally insulating core, the vapor barrier layer having a lower average permeance than the top cover as determined according to ASTM E96 Desiccant Method;
   (d) optionally, a bottom sheet apart from the vapor barrier; where:
      (i) the bottom sheet if present, and if not then the vapor barrier layer, serves as a bottom cover that is attached to the top cover to form an enclosure that surrounds the thermally insulating core, and if the bottom cover is separate from the vapor barrier the enclosure further surrounds the vapor barrier layer between the thermally insulating core and the bottom cover;

(ii) venting pathways are defined within the enclosure formed by the top cover and bottom cover, the venting pathways providing a vapor path from inside the bottom cover to the top cover with a permeance that is greater than the average permeance of the bottom cover; and (iii) the insulated spa cover having opposing top and bottom primary sides where the bottom side is most proximate of the two sides to the bottom primary side of the thermally insulating core and water of a spa that the insulated spa cover covers.

2. The insulated spa cover of claim 1, further characterized by the top cover having an average permeance in a range of 57.2 nanograms per Pascal*second*square meter and 22,300 nanograms per Pascal*second*square meter as determined by ASTM E96 Desiccant Method.

3. The insulated spa cover of claim 1, further characterized by the top cover entirely covering the top side of the thermally insulating core and one or more than one minor side of the thermally insulating core.

4. The insulated spa cover of claim 1, further characterized by the thermally insulating core being polymeric foam.

5. The insulated spa cover of claim 1, further characterized by the thermally insulating core being selected from expanded polystyrene foam and extruded polystyrene foam.

6. The insulated spa cover of claim 1, further characterized by the venting pathways being defined by grooves or channels in the thermally insulating core, a vapor permeable material between the bottom cover and the thermally insulating core, or both where the vapor permeable material has an average permeance that is greater than the top cover.

7. The insulated spa cover of claim 1, further characterized by the insulating core being free of any perforations or other openings extending entirely through the insulating core, through both the bottom side and the top side.

8. The insulated spa cover of claim 1, further characterized by the insulating core having protrusions extending from primary and minor sides so as to define venting pathways around the insulating core within the enclosure formed by the top and bottom covers.

9. The insulated spa cover of claim 1, further characterized by the vapor barrier layer and, if present, bottom sheet are chemically resistant to bromine, chlorine and ozone.

10. The insulated spa cover of claim 1, further characterized by the top and bottom covers being polymeric and melt-welded together to form the enclosure.

* * * * *